United States Patent [19]

Stapleton et al.

[11] Patent Number: 4,775,858
[45] Date of Patent: Oct. 4, 1988

[54] VIDEO IMAGE CREATION

[75] Inventors: Alan L. Stapleton; George W. Catlow, both of Newbury, Great Britain

[73] Assignee: Quantel Limited, Kenley, Great Britain

[21] Appl. No.: 771,245

[22] Filed: Aug. 30, 1985

[30] Foreign Application Priority Data

Oct. 10, 1984 [GB] United Kingdom ............... 8425531

[51] Int. Cl.⁴ .............................................. G09G 1/00
[52] U.S. Cl. .................................... 340/724; 340/723; 340/728; 340/747
[58] Field of Search ............... 340/716, 721, 723, 724, 340/747, 701, 798, 728, 710; 358/107, 280, 41, 141, 103

[56] References Cited

U.S. PATENT DOCUMENTS

| Re. 31,200 | 4/1983 | Sukonick et al. | 340/721 |
|---|---|---|---|
| 4,152,766 | 5/1979 | Osofsky et al. | 358/103 |
| 4,288,821 | 9/1981 | Lavallee et al. | 358/280 |
| 4,404,585 | 9/1983 | Hjortzberg | 358/41 |
| 4,514,818 | 4/1985 | Walker | 340/710 |
| 4,531,152 | 7/1985 | Lemelson et al. | 358/141 |
| 4,564,915 | 1/1986 | Evans et al. | 340/701 |
| 4,567,515 | 1/1986 | Schumacher | 358/107 |
| 4,928,065 | 1/1984 | Duvall et al. | 340/798 |

FOREIGN PATENT DOCUMENTS 1182926 2/1985 Canada.
60-05334 1/1985 Japan ................................. 340/716

OTHER PUBLICATIONS

Lax, L. et al., "NAPLPS Standard Graphics and the Microcomputer," *Byte*, Jul. 1983, pp. 82-92.

*Primary Examiner*—Marshall M. Curtis
*Assistant Examiner*—Mahmoud Fatahiyar
*Attorney, Agent, or Firm*—Cooper & Dunham

[57] ABSTRACT

This invention is concerned with systems that create video images. Previously these systems have been limited to ones which create images of television type resolution, however, the systems of this invention may produce an image of higher resolution. The operator draws on a touch tablet and chooses a color and implement type and a line is produced which appears on a screen in approximately real time. At the same time a corresponding line is being produced and written in at high resolution to a large frame store. The high resolution line will be produced at a slower rate than the line to be viewed and so a buffer store is provided for incoming signals. The high resolution image may be read to a print scanner or stored on a disc store.

18 Claims, 3 Drawing Sheets

VIDEO IMAGE CREATION

BACKGROUND OF THE INVENTION

This invention relates to improvements in video image creation systems.

In the system shown in FIG. 1 and described in U.S. Pat. No. 4,514,818 (U.S. Pat. No. 4,518,818) a video image may be created which resembles closely a picture created using conventional materials. The operator may choose a colour and notional implement by using a keyboard 1 and then by 'drawing' on a touch tablet 2 with a stylus an image is caused to appear on the TV colour monitor display 8. Choosing an implement and colour causes digital signals representing a luminance or chrominance distribution for a group of points adjacent to the designated picture points to be loaded into RAM 4 and causes digital signals representing three components of the chosen colour (at some reference luminance level) to be loaded into RAM 5. The three colour components in this example are Y, I and Q and the respective RAMs are denoted by the suffices A, B and C. Each RAM has a number of storage locations representing a sequence of picture points sufficient in number to represent the maximum area of distribution of the implements which can be chosen.

When a picture point is designated on the touch tablet by contact of the stylus, the address generator 9 derives signals representing the addresses of a square of storage locations in three frame stores 7A, 7B and 7C, provided respectively for the three colour components Y, I and Q. The size of the square corresponds to the sequence of locations in the RAMs 4 and 5, and the addresses generated by the address generator 9 are such as to locate the square at a position in the frame, determined from the co-ordinates of the point touched by the stylus.

For example, the address generator 9 and computer 3 may translate the co-ordinates to a corner of the patch. As each location in the square is addressed in the frame store 7A, 7B and 7C the corresponding locations are addressed in the RAM 4 and 5. For each point touched by the stylus there is read previously stored video signals for the respective square of storage locations and at the same time there is read the colour component signals from RAM 5A, 5B and 5C, and the distribution signals from RAM 4. The outputs are processed in processor 6A, 6B and 6C on a picture point by picture point basis with the digital signal information stored in the frame store 7 for each respective picture point.

In each processor the respective colour component signal is multiplied by the distribution signal read from the RAM 4 and the product combined in a predetermined way with the corresponding video signal from the frame stores 7A, 7B and 7C to produce a new video signal which is then written into the respective location in the frame store.

In this way each new picture point designated by the stylus is made up of a portion of the stored, as well as the incoming video information. Each distribution is for a patch of picture points adjacent the point designated by the touch tablet and stylus. The image is displayed on display 8.

The system can be set so that other information may be introduced to vary the picture point video signals. For example the pressure of the stylus on the touch tablet may be taken into account or the length of time the stylus is held over a point by providing that signal representing the pressure or length of time are used as multiplying factors for the colour component signals in RAMs 5. A facility for 'blurring' may also be available to simulate the effect of a rubber.

For a variety of practical considerations, such systems are usually limited to producing a video picture of broadcast television standard but there are many purposes for which a picture of much higher resolution would be desirable.

OBJECT OF THE INVENTION

The aim of the present invention is to provide an image creation system which can produce a picture of such higher resolution.

SUMMARY OF THE INVENTION

According to the present invention there is provided a video image creation system comprising:

input means for providing signals designating the address of a picture point, selector means for selecting colour component signals pertaining to said picture point and a number of adjacent picture points, buffer store means for storing the signals from said input means and said selector means prior to processing, frame store means for storing processed picture point signals, said frame store means being capable of storing a large number of picture points capable of representing a picture of high resolution, processing means for processing incoming picture point signals from said buffer store means with stored picture point signals from said frame store means, output means for outputing picture point signals from said frame store means, second frame store means for storing picture point signals representing a picture of lower resolution, means for using same incoming picture point signals from said input means and said selector means for processing in real time with picture point signals stored in said second frame store means, and display means for signals from second frame store means.

According to a further aspect of the invention there is provided processing means which operate on the output of the said first frame store means to display a portion of the output on the display means at full resolution or to produce a compressed image from the frame store means so that the complete image or a portion of the image appears on the display means at low resolution.

BRIEF DESCRIPTION OF DRAWINGS

The invention will now be discussed with reference to the accompanying drawings.

DESCRIPTION OF PREFERRED EMBODIMENT

The invention relates to the creation of a video image with high resolution. This is achieved by programming a computer to produce high-resolution digital signals and to process the incoming video information so that an image with a large number of picture points is produced. As the processing is still done picture point by picture point and there are a large number of picture points to be processed the system will not operate in real time and a buffer store has to be provided to store the incoming information. The same incoming information can be used in real time processing to produce an image which may be displayed as it is being created. Thus an operator may use the touch tablet, as in the prior art system, to produce an image in real time, whilst a corresponding high- resolution image is being produced. The high-resolution image can then be stored in a frame store of large capacity and used in, say, printing.

Figure 1:
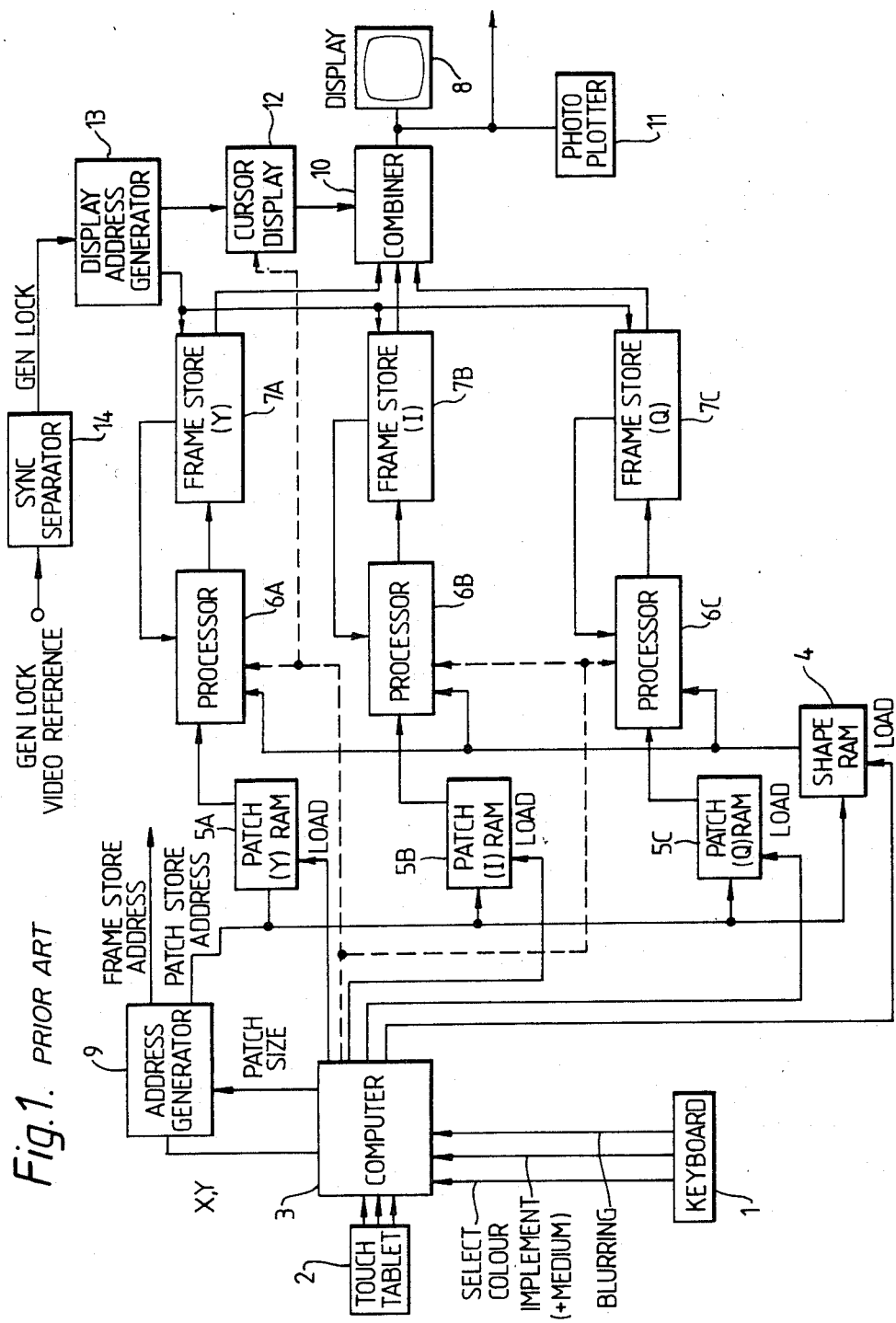
FIG. 1 shows the prior art system.

FIG. 1 shows the prior art system which is disclosed in U.S. Pat. No. 4,514,818. This system forms the real-time-processing part of the invention and will therefore be further described.

It has been found that to simulate the effect of an artists drafting implement e.g. paint brush, pencil etc., in a video image it is necessary to use a distribution of luminance, or chrominance levels for points adjacent to the point designated by the stylus. An example of such a distribution function can be seen at 4A and 5A in FIG. 2. The height K of the distribution function determines the relative contribution of the incoming information to the new picture point so that instead of getting a line with a sharp edge the video line will simulate the effect of the implement. A number of these distributions are stored in the form of 8 bit digital video signals with K<1 and these will correspond to the distributing power of different artists implements, the example in FIG. 2 being the distribution for a sharp pencil. It will be understood that signals having a value proportional to the amplitude of the function K are stored at respective locations of the RAM 4 in FIG. 1 the various locations being represented in FIG. 2 by the small square storing the distribution function K. To create an image the operator chooses an implement and also colour by means of keyboard 1 and by moving the stylus across the touch tablet 2 a sequence of groups of addresses are generated so that a corresponding stroke of the correct colour and characteristics will appear on display means 8.

The keyboard 1 generates digital signals which control the selection of the correct distribution signals to be loaded into RAM 4 and the colour or intensity components to be loaded in RAMs 5 by the computer 3. The signals used in the processing are 8 bit digital video signals. The signal from the keyboard also causes the computer to load the number of pixels to be processed in the patch into address generator 9, the patch size being varied, independence on the implement chosen. This is achieved by varying the number of locations addressed in the RAMs 4 and 5.

Figure 2:
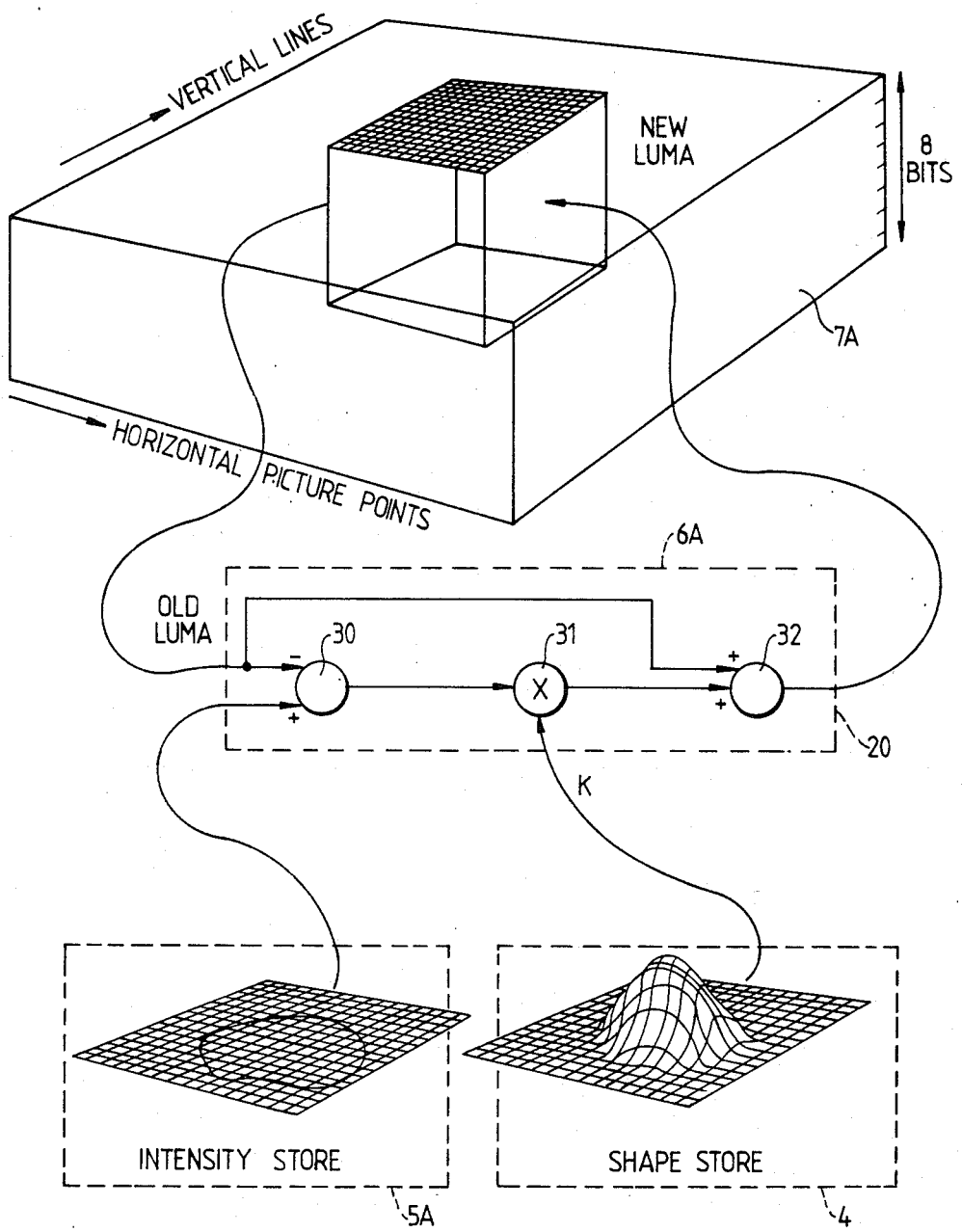
FIG. 2 shows examples of the luminance and intensity distributions and the arithmetic processor.

The processing will now be discussed with reference to the luminance path alone as the chrominance components are processed in the same way. The x, y co-ordinates of a point designated by the stylus and touch tablet are converted by the computer 3 and address generator 9 to the frame store address for the corner point designated. The address generator 9 also addresses points within the patch in RAM's 4 and 5A until all the patch has been accessed. The addressing system for addresses within the patch is described in detail in U.S. Pat. No. 4,514,818. As each point in the patch is addressed the value of K for that point from RAM 4 and also the intensity from RAM 5A are processed in processor 6A with the video signal from frame store 7A. FIG. 2 shows an example of the processor, which comprises in this case a digital subtractor 30, multiplier 31 and adder 32. It will be seen that the new video signal is made up of a portion of the incoming video signal and that stored at that point in the frame store 7A. The new video signal is $KP_L+(1-K) Lo$ when $P_L$ is the luminance accessed from RAM 5A and Lo is the stored picture point. This new picture point is stored in frame store 7A and can be displayed on display means 8 after combination in combiner 10 with the chrominance components. The address for the display is generated in address generator 13. The frame stores, processor and address generator are all known items of commerce for example those used in the equipment available under the trademark PAINTBOX from Quantel Ltd., Newbury, Berkshire, England. The frame stores are for example of the kind commonly used for televison purposes and have sufficient storage locations to produce images having a resolution comparable with that of broadcast television standards e.g. 525 lines at 30 frame/sec.

This processing continues until all the points in a patch have been processed and then the frame store address is moved to the next point that is designated by the touch tablet and a new patch is begun. This new patch will include some picture points from the previous patch but also some new picture points. The processing is done effectively in real time, in that pictures on the display are updated at the display frame rate and can thus normally keep up with the creation of the image as it is being 'drawn' on the touch tablet, though there may be a short delay of the order of a multiple of the frame time.

Figure 3:
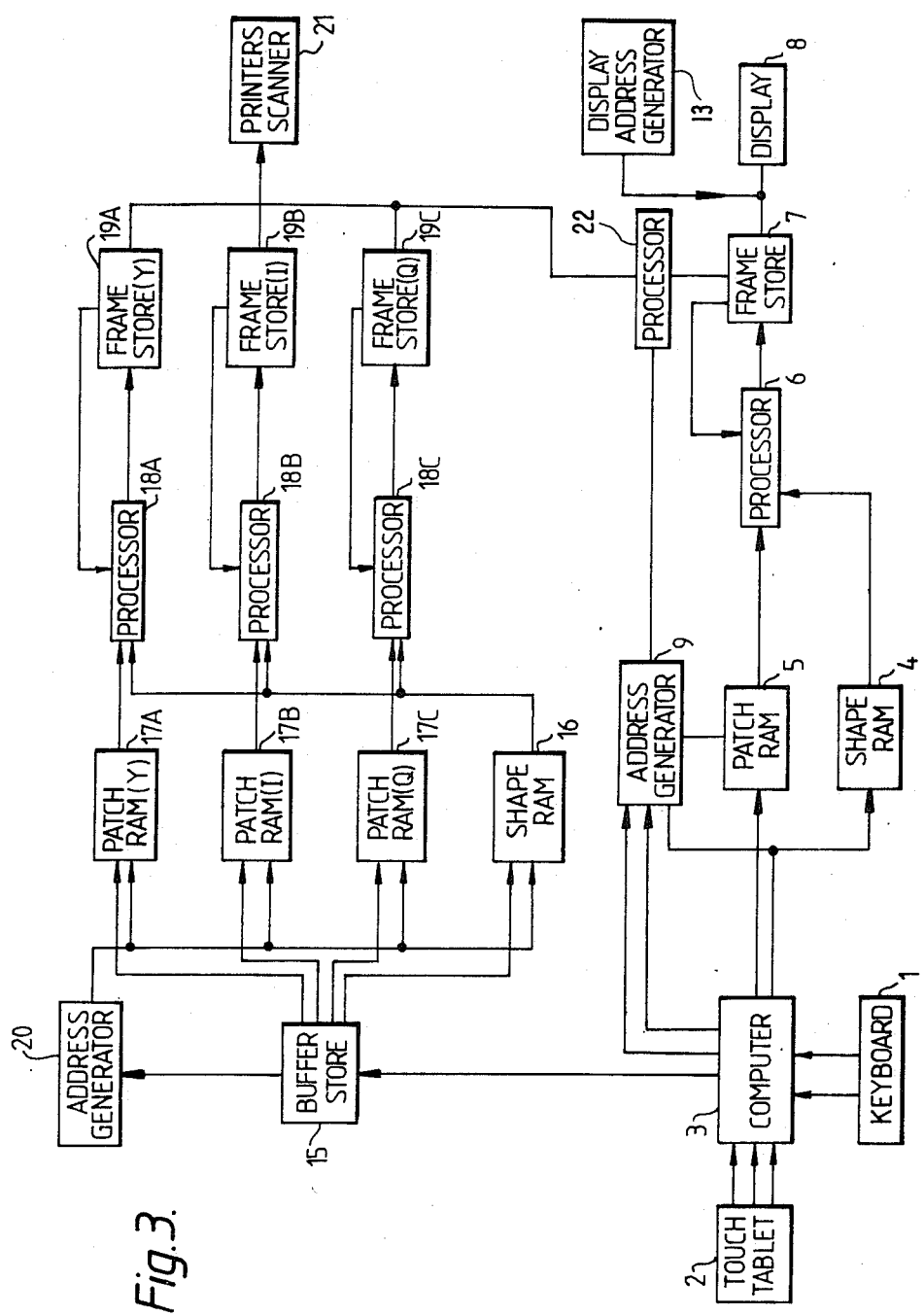
FIG. 3 shows an embodiment of the present inventions.

FIG. 3 shows an embodiment of the present invention with the FIG. 1 system being represented by the references 1-13 as before, showing only the path for one colour component.

The control signals are generated by the computer 3 in response to keyboard 1 and touch tablet 2, as in the prior art system and the real time processing proceeds as described previously. Reference numerals 15-21 identify components which form a system which is designed to use the incoming information and produce a video image with a large number of picture points and thus high resolution. As the number of picture points to be processed is much larger than in the real-time processing system this system is generally unable to operate in real time and so a buffer store 15 is provided to store the information from computer 3.

The computer controls the loading and accessing of chrominance, luminance and distribution signals loaded from RAM's 16 and 17, this information being processed picture point by picture point in processor 18. The chrominance, luminance and distribution signals correspond to those held in RAM's 4 and 5 except that the number of picture points to be processed in each patch is obviously larger for the high-resolution processing assuming strokes to be of the same width.

The addressing and processing operates in the same manner as the system in FIG. 1 except that the picture points to be processed are for a picture of much higher spatial resolution and are greater in number. Each new picture point is again a combination of incoming video information and that stored in frame store 19, which is capable of storing a large number of picture points. A suitable capacity for frame store 19 would be 2560 picture points by 2048 lines which is approximately 13 times that of frame store 7 (assuming a line in store 7 has about 760 picture points). The computer 3 sends information on the x, y co-ordinates for that picture point designated on the touch tablet and also on the implement and colour chosen. The signals used in this system may also be 8-bit digital video signals and the address generator, processor and frame stores are again known items of commerce such as those used in said equipment available under the trademark PAINTBOX. The image produced by this system is stored in the frame store 19 and corresponds to that viewed on the screen but with a greater number of picture points.

In the video graphic system as described in U.S. Pat. No. 4,514,818 and illustrated in the lower half of FIG. 3 the limiting factor on the definition of the final picture is the maximum reading and writing rate of the frame stores 7. To produce pictures having a definition comparable with television pictures of broadcast standard in real time it is required to write and read at storage locations at rates up to around 15 MHz. The artist will in general produce the image using the stylus at an irregular rate and position signals generated by the touch tablet are supplied to a buffer store in the computer so that they can be read out at a more regular rate which must nevertheless be within the capacity of the signal processor to process, bearing in mind that each position signal may require the reading and writing at up to 4000 storage locations in the frame store 7, determined by the maximum patch size. Touch tablet stylus combinations are currently available commercially which are capable of generating position signals at much higher definitions, than required for producing pictures of broadcast television resolution and in the combined high- and low-definition graphic system shown in FIG. 3, the touch tablet stylus combination is capable of generating position signals at a definition adequate for the high-definition channel. If necessary the computer 3 may interpolate between successive position signals.

These high-definition position signals are applied to the buffer store in the computer 3, and are read then to the buffer store 15. Furthermore, a proportion of the position signals in the computer buffer areread to the address generator 9, at the rate required to create in framestore 7 a lower-resolution version of the image being produced in 19. The writing and reading rates of the stores 19, which are limited by their construction are nevertheless the same as the writing and reading rates of the stores 7, and therefore the rate of operation of the processors 18 is limited to approximately the same as that of the processor 6. Consequently as the production of a picture in real time on the display monitor 8 progresses, the generation of the high definition video signal, representing the same picture, falls behind, though it may catch up in intervals when the artist is inactive. The buffer store 15 has therefore to have a capacity sufficient to store position signals from the touch tablet 1 stylus for the maximum lag likely to be encountered in practice though signalling means may be provided to signal if the store 15 tends to overflow. While the image is being created by the artist he can observe the effect he is creating on the display means 8, effectively as he works, although the high definition video signals are lagging substantially behind the work.

The high resolution output of frame store 19 may now be recorded on a disc store and used for, say, directly controlling a color printing process or it may be processed as described below. A processor 22 is provided so that a portion of the image in frame store 19 corresponding to the size of the display screen can be displayed at full resolution. The processor selects an area in response to an address generated by address generator 9 which can be controlled fromeither touch tablet or keyboard and displays the area on display 8.

Alternatively a larger area may be selected and compressed by the processor so that this may be displayed with a consequent loss of resolution. Processors capable of such selection and compression are well known, one example being the equipment available under the designation DPE 5000.

A high resolution picture monitor may be included in the high resolution graphic channel to display the high resolution picture when completed.

The system may also work in RGB or YUV components. The high-resolution picture may be read straight into a color printing scanner21 in which case the chrominance components may be at full bandwidth. The color printing scanner may be of well known construction.

What is claimed is:

1. A video image creation system comprising:
   drafting means which can be manipulated by an operator at a chosen rate which can fluctuate, to simulate strokes of a drafting implement;
   converting means for converting the manipulation of the drafting means into position signals defining successive points on said strokes at a high resolution, said converting means including means to generate said position signals at a rate related to said high resolution multiplied by the chosen rate of manipulation of said drafting means;
   a buffer store, first signal generating means, and address generating means, wherein: (i) said buffer store is connected to said converting means for receiving therefrom said position signals; (ii) said first signal generating means is responsive to position signals from said buffer store for generating first video signals having the resolution of said position signals and representing a high resolution image determined by manipulation of said drafting means, said first signal generating means having a first response rate capability; and (iii) said address generating means reads position signals from the buffer store to said first signal generating means at a response rate which is within the response rate capability of said first signal generating means;
   said buffer store serving to delay position signals if they are received by the buffer store from the converting means at a rate exceeding said first response rate capability of the first signal generating means;
   further signal generating means having a further response rate capabilitly and means connecting said converting means to said further signal generating means for feeding a selection of said position signals from said converting means to said further signal generating means, said further signal generating means being responsive to said selection of position signals fed thereto to produce second video signals representing a low resolution version of said image, said selection of position signals being fed to said further signal generating means at a rate which is within the further response rate capability of said further signal generating means; and
   means responsive to said second video signals to display said low resolution version of said image.

2. A video image creation system according to claim 1 including a source of signals representing color component signals and a source of signals representing the distributing power of a drafting implement over a group of picture points at said high resolution, wherein said first signal generating means are responsive to, and generate said first video signals as a function of, said color component signals and said distributing power signals in addition to said position signals.

3. A video image creation system according to claim 1 in which said first and further signal generating means include respective frame stores and said frame stores have substantially the same writing and reading rates.

4. A video image creation system comprising:
input means for providing position signals designating an address of a picture point;
selector means connected to said input means for selecting color component signals pertaining to said picture point and a number of adjacent picture points and for providing the selected color component signals;
buffer store means connected to said input means and to said selector means for receiving and for temporarily storing the position signals provided from said input means and the selected color component signal provided from said selector means and for selectively providing buffered signals selected from the signals stored therein;
high-resolution frame store means for storing processed picture point signals, said frame store means being capable of storing processed picture point signals which are for a large number of picture points and are capable of representing a picture of high resolution, said high-resolution frame store means selectively providing processed picture point signals selected from among the picture point signals stored therein;
first processing means connected to said buffer store means and to said high resolution frame store means for processing the signals provided from said buffer store with processed picture point signals provided from said high-resolution frame store means and for storing results of said processing in the high-resolution frame store means as updated processed picture point signals;
output means for outputting processed picture point signals from said high-resolution frame store means;
low-resolution frame store means for storing picture point signals representing a picture of relatively low resolution compared to said high-resolution picture;
second processing means connected to said input means, to said selector means and to said low resolution frame store means for processing at normal video rates position signals provided from said input means and color component signals provided from said selector means with picture point signals stored in said low-resolution frame store means and for storing results of said processing in the low-resolution frame store means as updated picture point signals; and
display means for displaying video signals derived from the picture point signals stored in the low-resolution frame store means.

5. A video image creation system as in claim 4 including means for operating on the picture point signals output from said high resolution frame store means by said output means to cause said display means to display a portion of said picture of high resolution on the display means at said high resolution.

6. A video image creation system as in claim 4 including means for producing a compressed image from the output of said high-resolution frame store means and for displaying, on said display means at low resolution, a compressed version of all or a part of the picture stored in said high-resolution frame store means.

7. A video image creation system as in claim 4 wherein said input means comprise a touch tablet and stylus system.

8. A video image creation system as in claim 4 wherein said selector means comprises a keyboard.

9. A video image creation system as in claim 4 including a color printing scanner responsive to said output means.

10. A video image creation system comprising:
a low resolution frame store for storing a low spatial resolution video picture and a high resolution frame store for storing a video picture having high spatial resolution, wherein the total number of pixels in the high resolution picture is at least ten times that in the low resolution picture;
designating means for designating pixels by their respective locations in a video picture;
generating means connected to the designating means for generating, in response to the designation of a pixel, pixel value signals for the designated pixel and for a number of other pixels having a selected spatial relationship to the designated pixel;
low resolution processing means connected to said generating means and responsive to the pixel value signals generated by the generating means for only selected ones of the designated pixels and coupled to the low resolution frame store to combine said pixel value signals for said selected designated pixels with any pixel values previously stored in the first frame store for respective pixels and to store the results of said combining in the locations for the respective pixels in the low resolution frame store;
a buffer store coupled to the generating means to temporarily store pixel value signals generated thereby;
high resolution processing means coupled to said buffer store to derive therefrom pixel value signals from the generating means stored in said buffer store and coupled to the high resolution frame store to combine pixel value signals derived from the buffer store with any pixel values previously stored in the high resolution frame store for respective pixels and to store the results of the last-recited combining in the locations for the respective pixels in the high resolution frame store;
wherein the low and high resolution frame stores operate at comparable read-in and read-out rates;
a display coupled to the low resolution frame store to display the contents thereof as a low resolution picture; and
means coupled to the high resolution frame store to produce a visible, high resolution image from the contents thereof.

11. A system as in claim 10 in which said low resolution picture is processed and displayed effectively at standard broadcast rate.

12. A system as in claim 10 including a processor coupled to the high resolution frame store means and to the display to cause the display to display selectively at least a portion of the high resolution image instead of the low resolution picture.

13. A system as in claim 12 in which said processor includes means for compressing at least a portion of the high resolution image into a lower resolution image and for causing the display to display selectively said lower resolution image.

14. A system as in claim 12 in which said processor includes means for selecting a portion of the high resolution image and for causing the display to display selectivelysaid portion at high resolution.

15. A system as in claim 10 in which the pixel value signals are for a color picture and include components related to chrominance and luminance.

16. A system as in claim 10 in which said designating means comprise a touch tablet and a drafting implement.

17. A system as in claim 14 in which the generating means include means for generating pixel value signals for a patch of pixels having selectable size and spatial relationships to the disignated pixel.

18. A system as in claim 17 in which the pixel value signals for the patch include control signals for the respective pixels in the patch, and the low and high resolution processing means include means responsive to said control signals to determine what proportion of the picture value signals for each pixel in the patch should be combined with contents of the frame store for the same pixel in order to arrive at the result to be stored in the storage location for said pixel in the respective frame store.

* * * * *